United States Patent [19]

Petrunia

[11] Patent Number: 5,129,030
[45] Date of Patent: Jul. 7, 1992

[54] MOVABLE LIGHTGUIDE CONNECTOR PANEL

[75] Inventor: Alexander Petrunia, Allentown, Pa.

[73] Assignee: AT&T Bell Laboratories, Murray Hill, N.J.

[21] Appl. No.: 707,503

[22] Filed: May 30, 1991

[51] Int. Cl.[5] .......................... G02B 6/00; G02B 6/36
[52] U.S. Cl. .................................................. 385/135
[58] Field of Search ................ 350/96.10, 96.20–96.22

[56] References Cited

U.S. PATENT DOCUMENTS

| | | | |
|---|---|---|---|
| 4,708,430 | 11/1987 | Donaldson et al. | 350/96.20 |
| 4,792,203 | 12/1988 | Nelson et al. | 350/96.20 |
| 4,818,054 | 4/1989 | George et al. | 350/96.22 |
| 4,824,196 | 4/1989 | Bylander | 350/96.20 |
| 4,832,436 | 5/1989 | Goto et al. | 350/96.20 |
| 4,898,448 | 2/1990 | Cooper | 350/96.20 |
| 4,934,785 | 6/1990 | Mathis et al. | 350/96.21 |
| 4,995,688 | 2/1991 | Anton et al. | 350/96.20 |

Primary Examiner—Akm E. Ullah
Attorney, Agent, or Firm—L. H. Birnbaum

[57] ABSTRACT

Disclosed is an optical fiber distribution frame which comprises trays including panels of optical connectors. Each tray is slidably mounted in the frame and can be pivoted downward to provide front access to the fibers and connectors in the frame.

7 Claims, 4 Drawing Sheets

MOVABLE LIGHTGUIDE CONNECTOR PANEL

BACKGROUND OF THE INVENTION

This invention relates to optical fiber distribution frames.

Optical fiber distribution frames are finding increasing use in telecommunications as an interface between optical fiber feeder (trunk) and distribution (transmission) cables. The frames usually include a plurality of trays or drawers, each of which includes a panel within which is mounted an array of optical connectors.

A desirable feature for the customer is to have quick and easy access to the fibers in the trays from the front of the frame. In order to accomplish this, a typical approach is to have the connector panel rotatably mounted on a vertical hinge (see, e.g., Donaldson et al U.S. Pat. No. 4,708,430). While effective, this technique has at least one drawback in that the fiber distribution cable can exit only on the hinged side of the tray, and, therefore, excess fiber is needed to accommodate the circuitous route required for connection to trays on the side opposite the hinge. An alternative proposal involves having the panel slide out with the tray (see Cooper U.S. Pat. No. 4,898,448). It has also been suggested that each tray including the panel be pivotally mounted to a cabinet (see Goto et al U.S. Pat. No. 4,832,436).

It is an object of the invention to provide an optical fiber distribution frame with easy front access to the optical fibers.

SUMMARY OF THE INVENTION

This and other objects are achieved in accordance with the invention which is an optical fiber distribution frame. The frame includes a plurality of shelves and a plurality of trays. Each tray comprises a panel including an array of optical fiber connectors mounted therein. The tray is slidably mounted within the shelf so that the tray can be pulled out in a horizontal direction from the shelf. Means are provided for pivoting the tray in a vertical direction once the tray has been pulled out from the shelf.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
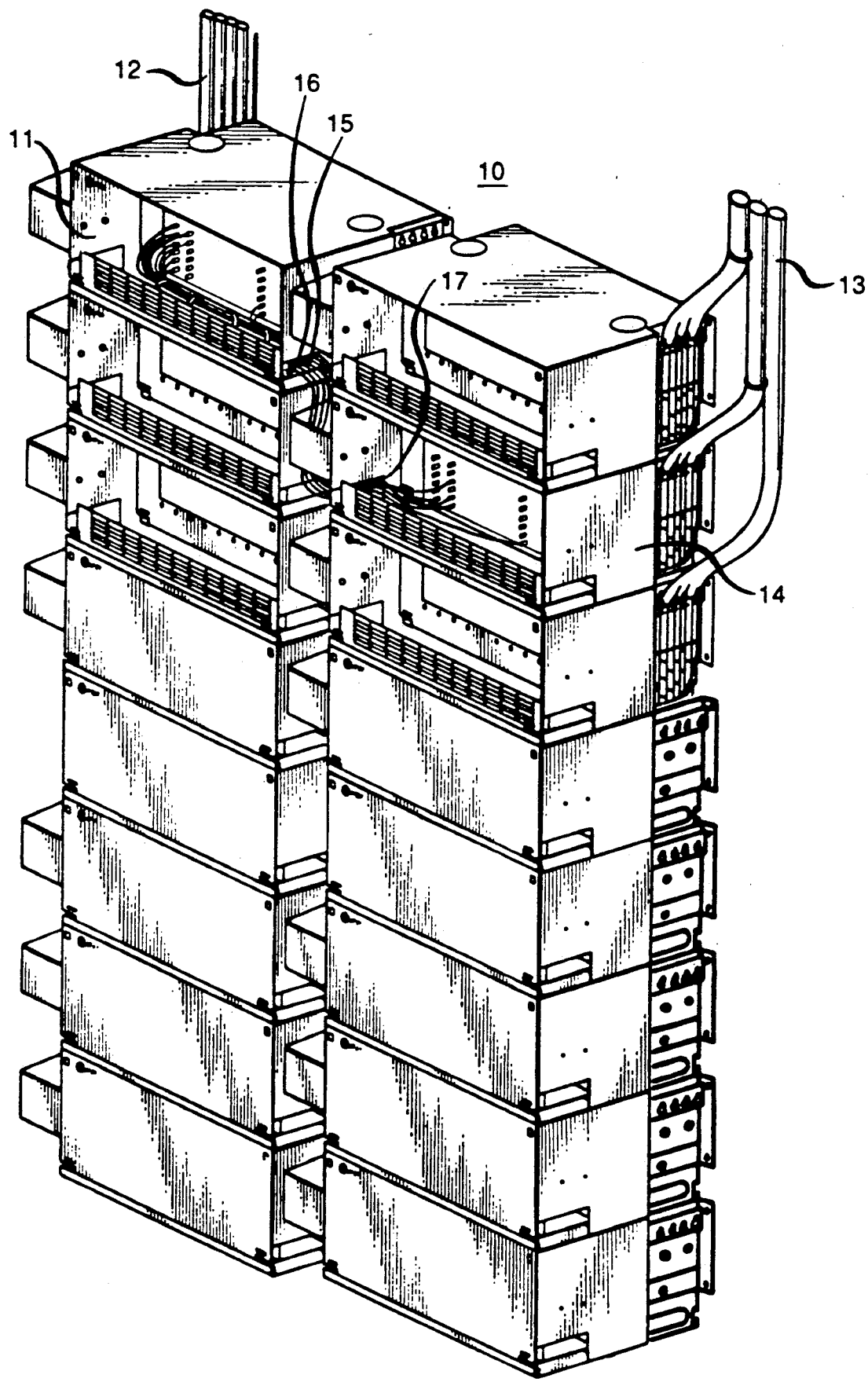
FIG. 1 is a perspective view of a fiber distribution frame in accordance with an embodiment of the invention.

FIG. 1 illustrates a typical fiber distribution frame, 10, in accordance with the invention. The frame includes a plurality of shelves, e.g., 11 and 14, arranged in two columns in this example. Each shelf includes a tray, to be described, where optical fibers from a trunk cable 12 or transmission cable 13 are connected with jumper fibers, 15, for purposes of cross-connection between the cables. Typically, the trunk cable 12 or transmission cable 13 is brought into the frame at the back and fibers from the cable are introduced into each tray through an aperture which can be located at the front or rear of the shelves.

For purposes of illustration, the doors of the top three shelves in each column have been removed. Again, for purposes of illustration, a set of jumper fibers, 15, are shown connected from shelf, 11, through aperture, 16, to shelf 14 through aperture, 17. Of course, any fiber from the trunk cable can be interconnected with any fiber from the transmission cable through jumpers between appropriate shelves. In this example, each of the shelves in the left-hand column has access to the trunk cable and each of the shelves in the right-hand column has access to the transmission cable, but any other type of arrangement is possible.

The particular frame shown is designed for mounting to a wall, but free-standing frames may also utilize the principles of the invention.

Figure 2:
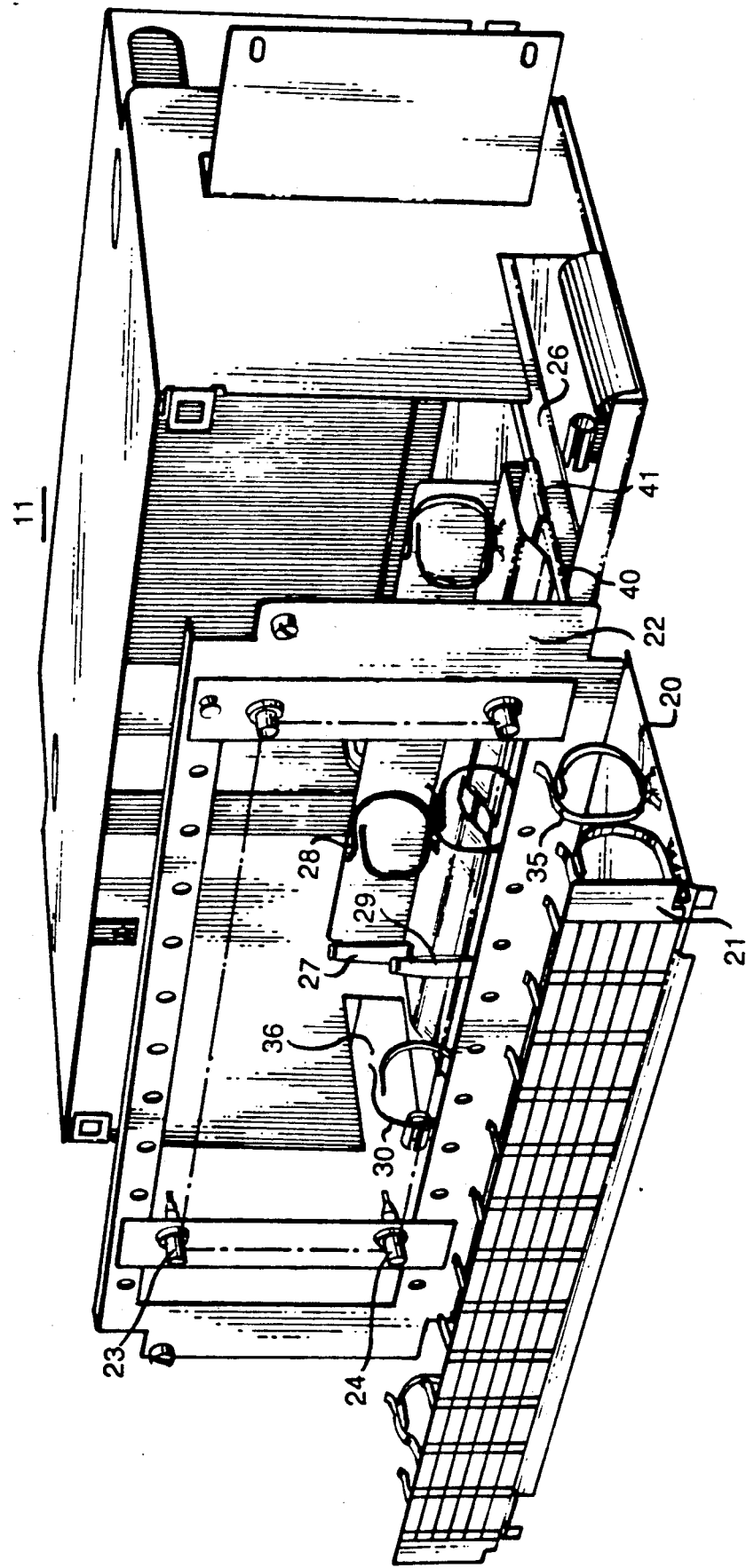
FIGS. 2-3 are perspective views of one shelf of the distribution frame of FIG. 1.
Figure 3:
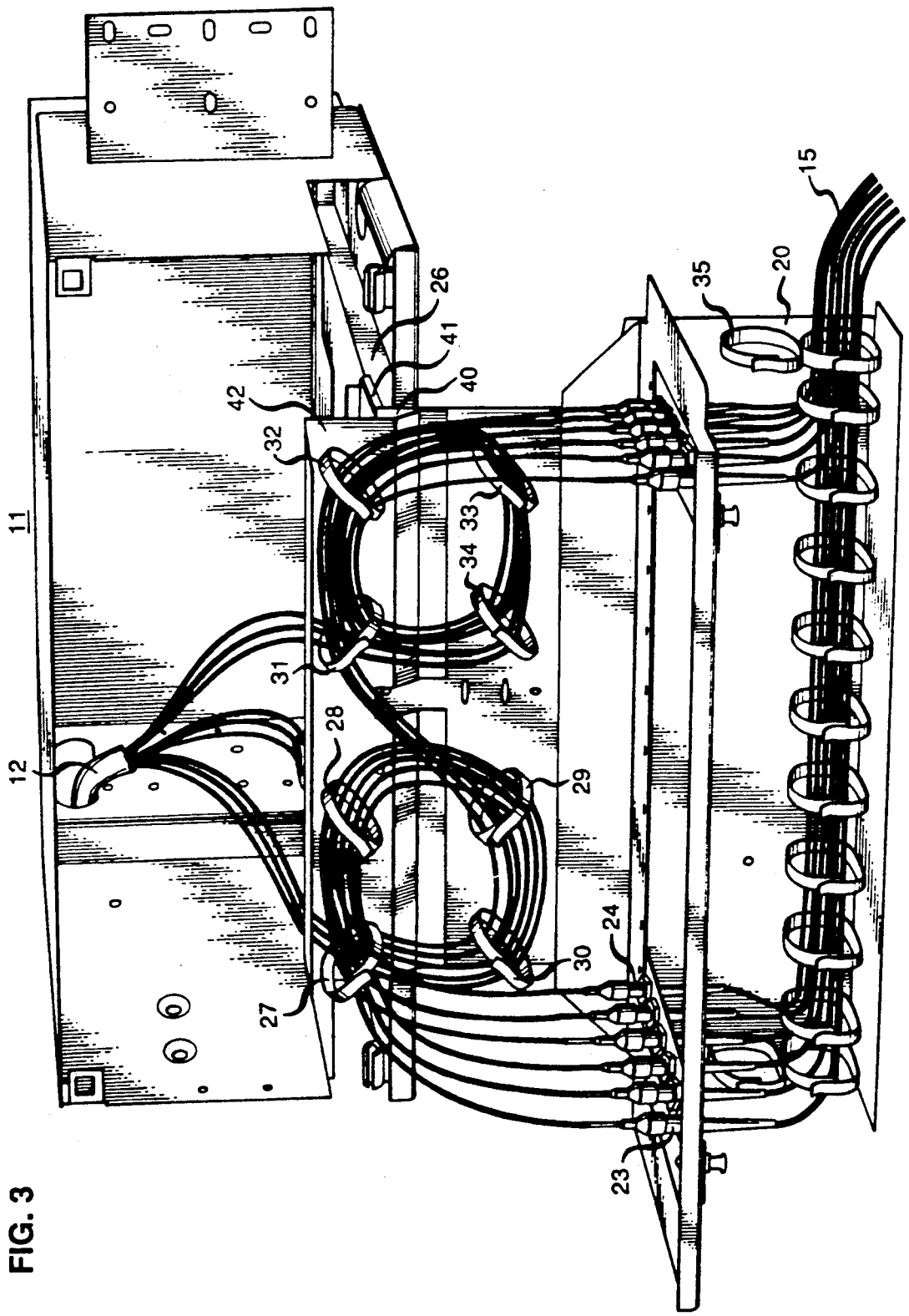
Figure 4:
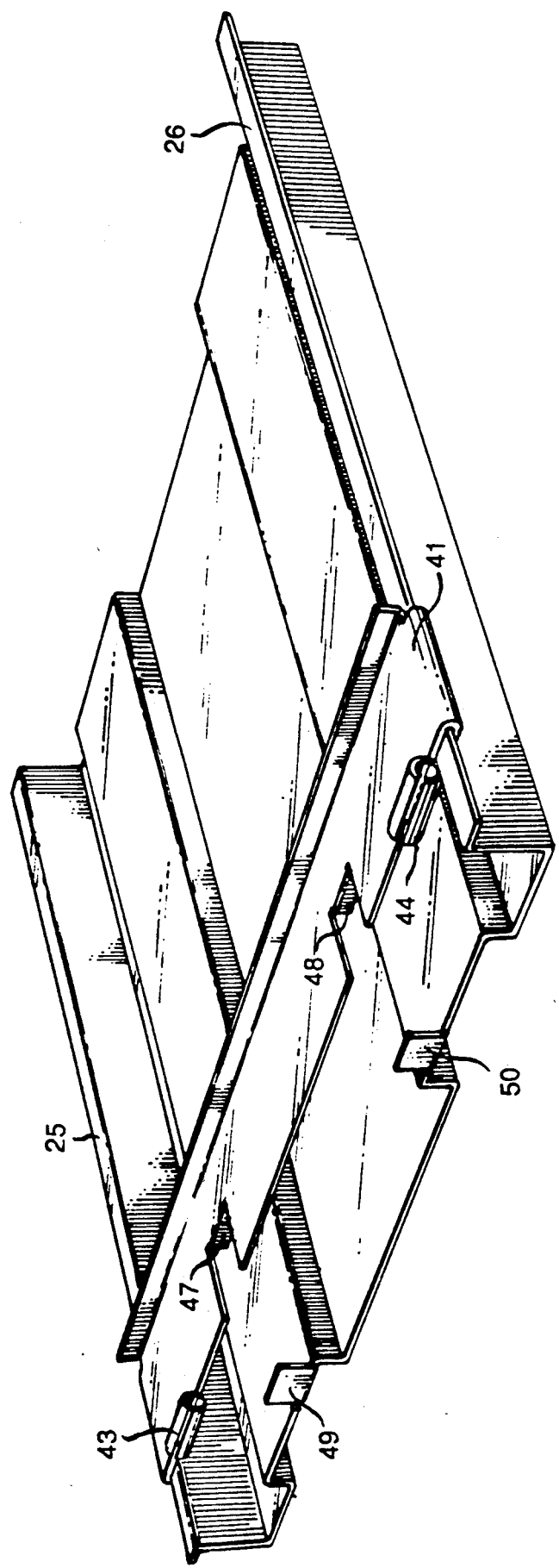
FIG. 4 is a perspective view of a portion of the shelf of FIGS. 2-3.

FIGS. 2-4 illustrate one particular shelf, 11, from the frame. FIG. 2 shows the shelf with a tray 20, mounted therein and partially withdrawn from the shelf. The door of the shelf has been removed. Visible are a front face plate, 21, and a panel, 22, which includes a plurality of optical fiber connectors, such as 23 and 24, mounted therein. Only a few connectors are shown for purposes of clarity in the illustration. The fiber connectors can be any of the standard type connectors, such as the "ST ®" connector, and will not be discussed in further detail (see e.g., Mathis et al U.S. Pat. No. 4,934,785).

With further reference to FIG. 3, which illustrates the tray 20 fully pulled out of the shelf, it will be noted that the tray, 20, includes forward and rearward members, 40 and 41, respectively, on the bottom surface. These members are slidably mounted on the rails 25 and 26 located at the bottom surface of the shelf. It will also be noted that, in this example, the cable 12, enters the shelf through a rear aperture and is then wrapped around two sets of holding rings 27-30 and 31-34. The individual fibers within the cable fan out from the holding rings where they are terminated in their corresponding connectors in the panel 22. Near the opposite (front) surface of the panel, 22, a further set of holding rings (e.g., 35) is provided for containing the jumper fibers 15. It will be noted that the holding rings and panel are all mounted to the bottom surface of the tray. Again, it will be appreciated that only a few fibers are shown for clarity in the illustration. Also, while the cable is shown as entering from the top of the shelf through the rear, it can also enter from the bottom and through apertures in the front (e.g., 36). The cable, 12, is held in position by standard tie-wrap supports (not shown).

In accordance with an important feature of the invention, the tray, 20, pivots downward approximately 90 degrees once it reaches its fully retracted position as illustrated in FIG. 3. This gives the craftsperson easy access to the connectors and fibers to the rear of the panel 22 when it is desired, for example, to clean a connector or connect additional fibers from the cable 12. It also permits the jumper fibers to exit through the front apertures on either side of the shelf.

The particular means employed for this pull-out and pivot feature is best seen in FIGS. 3 and 4, the latter figure illustrating only the rearward member 41 as it is mounted on the bottom of the shelf. As previously mentioned, the members, 40 and 41, are slidably mounted on the rails 25 and 26 of the shelf. The panel, 22, and fiber rings, 27-35, are all mounted on the forward member 40. In particular, the rings 27, 28, 31 and 32 are mounted to a plate 42 which is, in turn, mounted to member 40 and extends over member 41 when the tray is in its horizontal position.

It will be noted that forward member 40 is coupled to rearward member 41 through a pair of gapped hinges 43 and 44 which project from the edge of the rearward member. That is, forward member 40 includes a pair of slits (not shown) through which project a portion of each hinge 43 and 44, respectively, when the edge of the forward member is inserted in the gaps of the hinges. The rearward member 41 also includes a pair of tabs 47 and 48 which engage stop members 49 and 50, respectively, mounted at the bottom of the shelf, when the tray has been fully retracted from the shelf.

Thus, in the operation of the pull-out and pivot mechanism, the tray will remain in a horizontal position as long as both members 40 and 41 ride on the rails 25 and 26 in the shelf. As the tray reaches its fully extended position, member 40 will extend beyond the rails and, by the force of gravity, drop down while rotating approximately 90 degrees in the hinges which keep it mechanically coupled to member 41. Some additional movement of member 41 will usually result, but this member is kept within the shelf by the stops 49 and 50. At this point, the fibers and/or connectors can be serviced. In order to return the tray to its enclosed position with the shelf, member 40 is lifted up to its horizontal position and pushed in so that it again engages the rails.

Various modifications of the inventions will become apparent to those skilled in the art. All such variations which basically rely on the teachings through which the invention has advanced the art are properly considered within the scope of the invention.

I claim:

1. An optical fiber distribution frame comprising
   a plurality of shelves including trays positioned therein, each tray comprising:
   a panel including an array of optical fiber connectors mounted therein, each tray also being slidably mounted within a shelf so that the tray can be pulled out in a horizontal direction from the shelf; and
   means for pivoting at least a portion of the tray including the panel in a vertical direction once the tray has been pulled out from the shelf.

2. The device according to claim 1 wherein each tray further comprises retaining rings for holding optical fibers coupled to the connectors.

3. The device according to claim 1 wherein the tray includes a forward and rearward member which are mechanically coupled by at least one hinge which permits the forward member to rotate with respect to the rearward member.

4. The device according to claim 3 wherein the shelf includes a rail on which both members are slidably mounted while the tray is moved in a horizontal direction, but where the forward member extends off of the rail to permit pivoting when the tray has been pulled out sufficiently from the shelf.

5. The device according to claim 4 wherein the shelf includes a stop member for retaining the rearward member of the tray on the rail when the tray is pulled out from the shelf.

6. A tray for interconnecting and storing optical fibers comprising:
   forward and rearward bottom members, each adapted for slidably mounting to a rail;
   a panel adapted for mounting an array of optical connectors, said panel being mounted to the forward member; and
   means for mechanically connecting the forward and rearward members comprising at least one hinge which permits the forward member to rotate in a vertical direction with respect to the rearward member.

7. A device for storing and interconnecting optical fibers comprising:
   a shelf including a bottom portion with at least one rail mounted therein;
   a tray including forward and rearward members slidably mounted to said rail, the members being mechanically connected by at least one hinge which permits the forward member to rotate in a vertical direction with respect to the rearward member only when the tray is pulled out from the shelf; and
   stop means for keeping the rearward member from sliding off the rail when the tray is pulled out from the shelf.

* * * * *